R. Stewart,
Steam-Engine Valve-Gear.
N° 38,611.  Patented May 19, 1863.
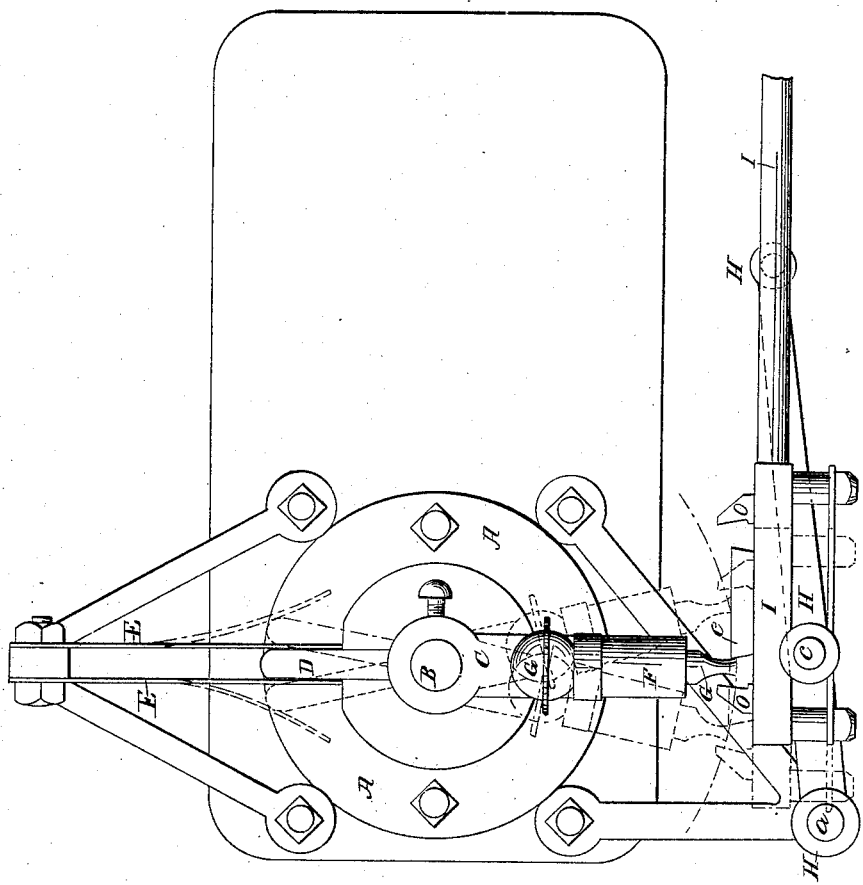
Witnesses:
Inventor:
Robert Stewart.

UNITED STATES PATENT OFFICE.

ROBERT STEWART, OF ELMIRA, NEW YORK.

IMPROVED CUT-OFF-VALVE GEAR.

Specification forming part of Letters Patent No. 38,611, dated May 19, 1863.

*To all whom it may concern:*

Be it known that I, ROBERT STEWART, of Elmira, in the county of Chemung, in the State of New York, have invented a new and useful Invention for Operating the Cut-Off Valves of Steam-Engines; and I do hereby declare that the following is a full, clear, and exact description thereof, reference being had to the accompanying drawing, and to the letters of reference marked thereon.

The figure represents a front elevation of the invention.

This invention is an improvement upon the invention described in my application for a patent for a "steam cut-off and regulator-valve," filed in the Patent Office on July 5, 1862.

In the drawing, A is the outer shell of the valve.

B is the valve-shaft.

C is the crank-lever attached to and operating the valve-shaft B.

D is a spur or arm formed by the upward prolongation of the collar of the crank C.

E E are springs embracing the spur D, and by their action serve to keep the crank vertical, and consequently the valve shut.

F is a sleeve on the extremity of the crank, and in which the weighted pin G rises and falls.

H is a lever pivoted at *a* to a bracket depending from the valve and connected at the other end to a governor.

*c* is a wrist upon this lever a short distance from its pivot *a*. The lever I, which is connected to the eccentric valve-rod, rides reciprocatingly upon the wrist *c*.

*e* is a steel dog made upon the lever I, and bites or takes against the end of pin G, which extends below the sleeve F.

*o o* are guards on each side of the dog *e*, for a purpose hereinafter set forth.

In the operation of my invention, steam being admitted at full pressure from the boiler to the valve, the crank C is oscillated by hand, so as to open the valve-ports and admit sufficient steam to the cylinder to start the machinery. The engine then, being at work, gives motion to its governor, (or other regulating device,) which raises or lowers the end of the operating-lever H in the usual manner. This lever correspondingly raises or lowers the reciprocating-rod I and its dog *e*. It will thus be seen that the degree of bite or lap that this dog has against the pin G is in proportion to the rise and fall of the governor. Now, as the rod H reciprocates its dog *e* alternately pushes and pulls against the pin G, which forms the extreme of the crank C, and thereby opens the valve-ports. It is evident that the more bite the dog has the farther the pin will have to be forced or oscillated to the right or left before it is lifted above the horizontal plane in which the dog traverses, and that the valve-ports are opened in proportion as the pin is oscillated. When the pin is forced far enough to the right or left for the curve in which it oscillates to be intersected by the plane in which the dog traverses (see red and blue lines) it slips from the bite of the dog, and is immediately thrown back to its vertical position by the springs E E, thus instantly closing the valve-ports. After the pin is released the dog continues on until the full stroke is completed. The pin and dog thus move at this instant in opposite directions, which could not be if the pin did not rise and fall in the sleeve, so as to yield to the dog. This pin G works in its sleeve F, so that it may easily and instantly slide over the dog when released from its bite and drop down at its opposite end ready to be acted upon again.

The guards *o o* serve to close the ports in case of an accident, (such as breaking a spring,) by catching against the pin G and bringing it to a vertical position.

Having thus fully described the construction and operation of my invention, what I claim as new, and desire to secure by Letters Patent, is—

1. The pin G, working in sleeve F, in combination with the crank C, in the manner and for the purposes set forth.

2. The dog *e* and guards *o o*, in combination with lever I, constructed and operating substantially as set forth.

ROBERT STEWART.

Witnesses:
T. G. CLAYTON,
JO. C. CLAYTON.